United States Patent [19]

Imae et al.

[11] Patent Number: 5,036,330
[45] Date of Patent: Jul. 30, 1991

[54] RANGING SYSTEM USING CORRELATION BETWEEN TWO SPREAD SPECTRUM WAVE SIGNALS

[75] Inventors: Michito Imae, Kodaira Higashi-Murayama, both of; Chihiro Miki, Higashi-Murayama, both of Japan

[73] Assignee: Communications Research Laboratory Ministry of Post and Telecommunications, Koganei, Japan

[21] Appl. No.: 498,550

[22] Filed: Mar. 26, 1990

[30] Foreign Application Priority Data

Apr. 11, 1989 [JP] Japan ................................. 1-91135

[51] Int. Cl.$^5$ .......................... H04B 7/185; G01S 5/02
[52] U.S. Cl. .................................... 342/357; 375/1
[58] Field of Search ................... 342/357, 352; 375/1

[56] References Cited

U.S. PATENT DOCUMENTS 4,809,005  2/1989  Counselman, III ................ 342/357

Primary Examiner—Theodore M. Blum
Attorney, Agent, or Firm—Oblon, Spivak, McClelland, Maier & Neustadt

[57] ABSTRACT

A ranging system using the correlation between two spread spectrum wave signals includes an antenna for receiving from a single radio source two spread spectrum modulated signals simultaneously transmitted in the same code on carrier waves of different frequency, a multiplier for multiplying the received signals by each other to generate two continuous signals of frequencies respectively equal to the difference and the sum of the carrier waves of the spread spectrum signals, and a data processing computer for measuring the phases of the two continuous signals with reference to a reference clock at the receiving station so as to remove the ambiguity at the time of range measurement.

1 Claim, 2 Drawing Sheets

FIG. I(a)
PRIOR ART
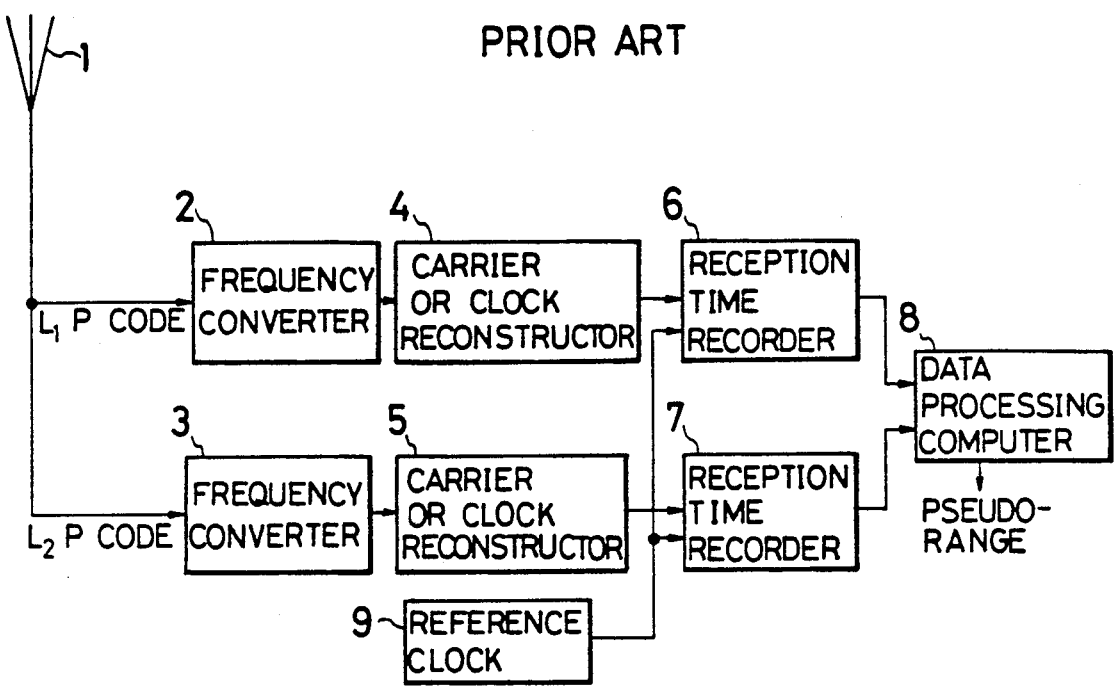
FIG. I(b)
PRIOR ART
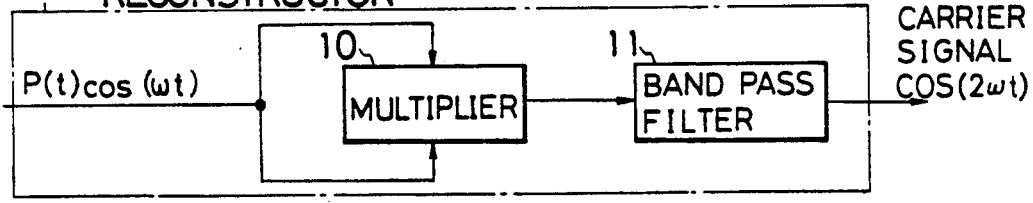
FIG. I(c)
PRIOR ART
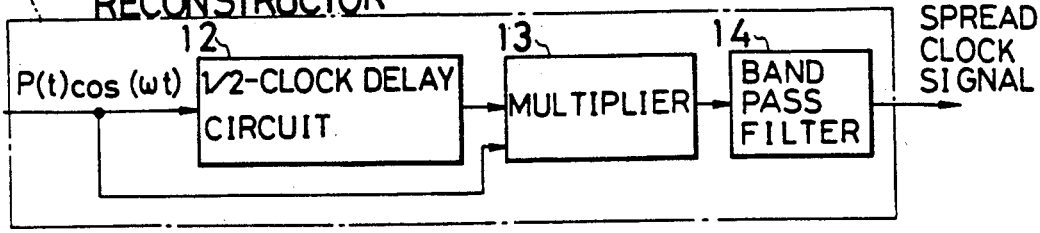

RANGING SYSTEM USING CORRELATION BETWEEN TWO SPREAD SPECTRUM WAVE SIGNALS

BACKGROUND OF THE INVENTION

1. Field of the Invention

This invention relates to a system for high-precision measurement of the distance among a plurality of signal reception points or between artificial satellites and signal reception points using the correlation between two spread spectrum wave signals.

2. Prior Art Statement

As a method for measuring position using the GPS (Global Positioning System) satellite under development by the United States there has been developed a system in which the receiver has a built-in code generator which uses the 1575.42 MHz (hereinafter referred to as L1) band distance-measurement spread signal whose code data has been made available to general users (hereinafter referred to as the C/A code). However, the spread modulation signals (hereinafter referred to as the P code) for high-precision position measurement that are transmitted on L1 and the 1227.6 MHz (hereinafter referred to as L2) band have been designated for military use and the code data is not available for general users. It is therefore generally difficult to carry out high-precision positioning using the P code.

On the other hand, development is proceeding on distance measurement systems that use signals transmitted by the GPS satellite for high-precision relative position measurement and do not require code data. These systems fall into three categories:

(1) A system in which the received signal is squared to reconstruct a continuous signal of twice the frequency of the carrier wave;
(2) A system in which the spread modulation clock signal of the received signal is reconstructed;
(3) A system in which the above two systems are used in combination.

These systems determine range by measuring the phase (time interval relative to the reference clock at the reception point) of the reconstructed carrier wave signal or clock signal at the time of reception. The time difference between the clock aboard the satellite and the clock at the reception point and the product obtained by multiplying the time delay caused by the intervening ionosphere and atmosphere along the propagation path by the speed of light are included in the determined distance. The result is thus called the "pseudo-range" as opposed to the "true range." The measurement is simultaneously conducted at two or more reception points with respect to four or more satellites and the distances among (relative positions of) the reception points are calculated from the results of the measurement.

FIG. 1(a) shows a conventional GPS receiver system for precision relative position measurement which will be used as the basis for explaining the principle involved up to the determination of the pseudo-range by reconstruction of the carrier wave or the spread clock signal from the spread spectrum signal. Signals of frequency L1 and L2 received by an antenna 1 are converted to an intermediate frequency in frequency converters 2, 3, respectively, and a carrier signal and a clock signal are reconstructed in carrier or clock reconstructors 4, 5. Next a pseudo-range including ambiguity arising during each period of the reconstructed signals is obtained by forwarding the signals reproduced by the reconstructors 4, 5 to reception time detectors 6, 7 and measuring them with reference to a reference clock 9 at the reception time. The measured data is forwarded to a data processing computer 8 where it is stored. The ambiguity arising during each period of the reconstructed signals is then removed from the stored data to obtain a pseudo-range.

The principle of the carrier reconstructors 4, 5 of FIG. 1(a) will now be explained with reference to FIG. 1(b). The received spread signal $P(t)\cos(\omega t)$ is split and the two resulting signals are multiplied in a multiplier 10, whereby there is reconstructed a continuous wave signal having twice the frequency of the carrier frequency. The result is forwarded to a band pass filter 11 for extracting only a signal $\cos(2\omega t)$.

The principle of the clock reconstructors 4, 5 (for spread modulation) of FIG. 1(a) will next be explained with reference to FIG. 1(c). The received spread signal $P(t)\cos(\omega t)$ is split and one of the two resulting signals is forwarded directly to a multiplier 13, while the other is sent to a ½-clock delay circuit 12 where it is delayed by ½ period of the spread clock and is then forwarded to the multiplier 13. The multiplier multiplies the two signals and the resulting reconstructed clock signal is passed through a band pass filter 14 to extract a spread clock signal. These signal reconstruction methods are widely used for carrier wave reconstruction and clock reconstruction of PSK (phase shift keying) signals in digital communication.

In the carrier wave reconstruction system (1) mentioned above, the period of the reconstructed carrier signal is short so that from the point of ambiguity elimination for calculating the pseudo-range from the measured results, a prolonged time and data processing time are required, which places a large burden on the software.

In the spread modulation clock signal reconstruction system (2), the long clock period makes removal of ambiguity relatively easy but for increasing the precision of the measurement it is necessary either to conduct measurement over a long period of time or to use an antenna with large gain.

Moreover, measurement is conducted only at a single frequency in these systems, making it impossible to measure the propagation delay time caused by the ionosphere, which, having an effect inversely proportional to the square of the frequency of the carrier wave, is one cause of error. Another problem is that it is necessary to conduct the measurement in both the L1 and L2 frequency bands and then to estimate the ionospheric propagation delay from the difference between the results obtained. The receiver is thus required to have separate systems for L1 and L2. Not only is this uneconomical, it also complicates the data processing.

The object of this invention is thus to provide, in a high-precision relative position measuring system for receiving signals from a plurality of GPS satellites and measuring pseudo-ranges between the satellites and the reception point based on the received signals, an improved ranging system using the correlation between two spread spectrum wave signals which is capable of calculating pseudo-range easily and with high precision using only a single signal processing system.

OBJECT AND SUMMARY OF THE INVENTION

For achieving the aforesaid object, the present invention provides a ranging system using the correlation between two spread spectrum wave signals wherein two spread spectrum modulated signals simultaneously transmitted in the same code on carrier waves of different frequency are received from a single radio source such as an artificial satellite, the received signals are multiplied by each other to generate two continuous signals of frequencies respectively equal to the difference and the sum of the carrier waves of the spread spectrum signals, and the phases of the two continuous signals are measured with reference to a reference clock at the receiving station to thereby remove ambiguity at the time of range measurement.

As mentioned in the foregoing, in the present invention an L1 P-code signal and an L2 P-code signal received via an antenna are multiplied by each other to regenerate carrier signals of frequencies equal to the sum of and difference between the frequencies of the L1 and L2 signals, whereby the ambiguity is removed at the time of the pseudo-range calculation. By this method, the measurement error is within ±several millimeters and information can also be obtained regarding the ionospheric delay.

The above and other features of the present invention will become apparent from the following description made with reference to the drawings.

BRIEF DESCRIPTION OF THE DRAWINGS

FIG. 1(a) is block diagram of a conventional GPS receiver system for relative positioning.

FIG. 1(b) is a block diagram of the carrier reconstructor of FIG. 1(a).

FIG. 1(c) is a block diagram of the clock reconstructor of FIG. 1(a).

DETAILED DESCRIPTION OF THE PREFERRED EMBODIMENT

Figure 2:
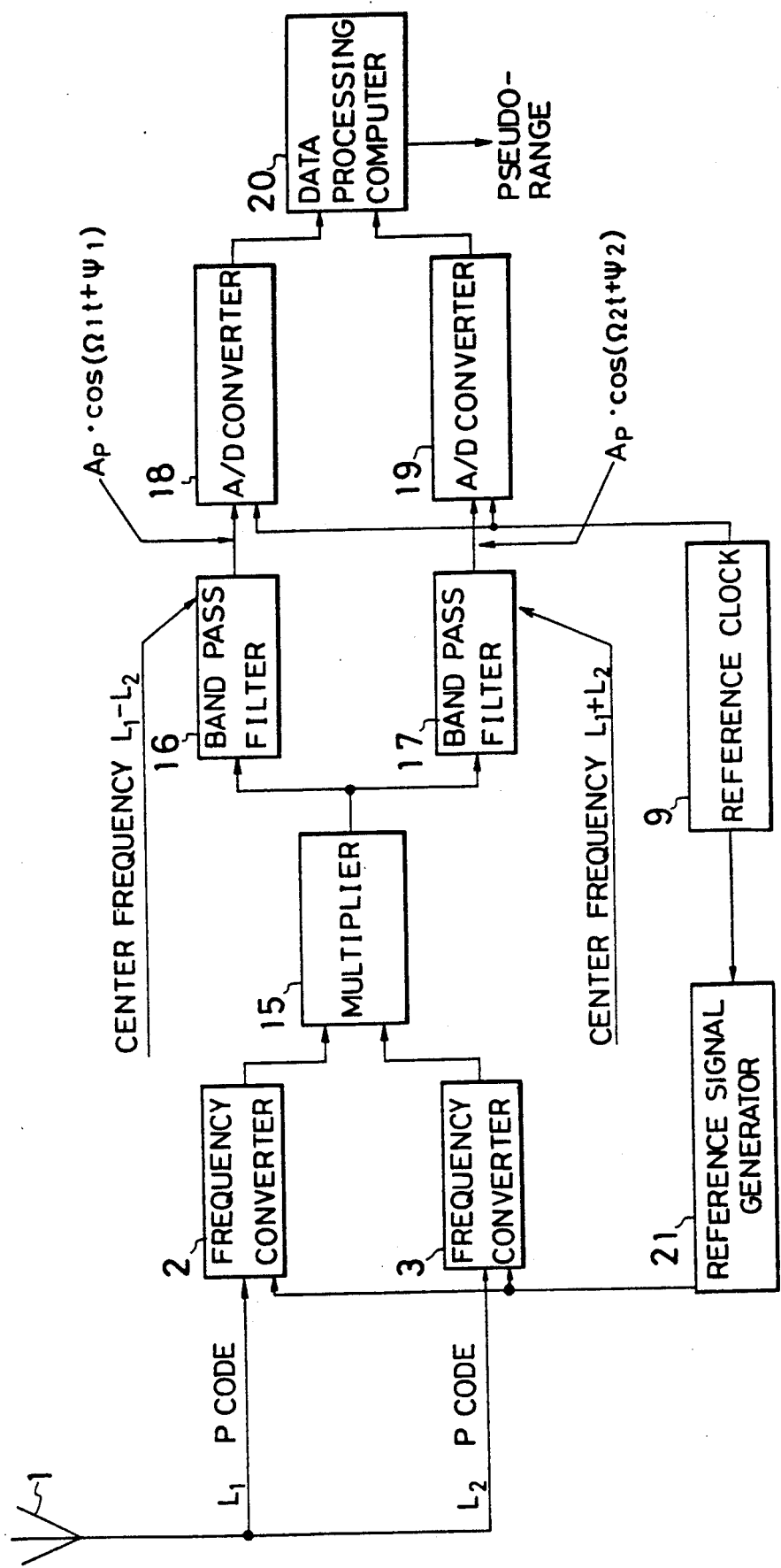
FIG. 2 is block diagram of a GPS receiver system for relative positioning in accordance with the present invention.

A block diagram of the GPS receiver system for relative positioning in accordance with the present invention is shown in FIG. 2. Two spread spectrum modulated signals simultaneously transmitted in the same code on carrier waves of different frequency are received from a single radio source such as an artificial satellite. More specifically, an L1 P-code signal and an L2 P-code signal of the GPS satellites are received by an antenna 1. The received signals are converted to intermediate frequency band signals in frequency converters 2, 3 whose local signals are generated by a reference signal generator 21 that is synchronized with a reference clock 9.

The L1 and L2 intermediate frequency signals output by the frequency converters 2, 3 are directly multiplied by each other in a multiplier 15. The L1-L2 carrier signal and L1+L2 carrier signal components of the output from the multiplier 15 are extracted by band pass filters 16, 17 and these sum and difference signals are then converted to digital signals in A/D converters 18, 19 with reference to a reference clock at the reception point. The pseudo-range is then calculated by a data processing computer 20.

Calculation of the true distance from the pseudo-range is conducted in the conventional manner.

The principle of this invention will now be explained in detail.

Defining the code sequence of the P code as P(t) (where the clock period is $T_0$ and the amplitude is ±1) and the angular frequency of the carrier waves L1, L2 as $\omega_1$ and $\omega_2$, then since both the carrier waves L1, L2 and the codes are transmitted from the satellite in the same phase, the P-code signal can be represented as $$P1(t) = P(t)\cos(\omega_1 \cdot t) \quad (1)$$

$$P2(t) = P(t)\cos(\omega_2 \cdot t) \quad (2)$$

At the reception point antenna terminal, there is a delay with respect to Eqs. (1) and (2) equal to the geometric distance $\rho$ between the satellite and the reception point, the ionospheric delay along the propagation path (group delay $T^G_{ION}(\omega)$ for the code component, phase delay $T^P_{ION}(\omega)$ for the carrier component) and the atmospheric propagation delay ($T_{TROP}$), whereby we have $$P1_r(t) = P(t - t_p(\omega_1)) \cdot \cos[\omega_1 \cdot \{t - t_c(\omega_1)\}] \quad (3)$$

$$P2_r(t) = P(t - t_p(\omega_2)) \cdot \cos[\omega_2 \cdot \{t - t_c(\omega_2)\}] \quad (4)$$

where $$t_p(\omega_j) = \rho/c + T^G_{ION}(\omega_j) + T_{TROP}$$

$$t_c(\omega_j) = \rho/c + T^P_{ION}(\omega_j) + T_{TROP}$$

$$T^G_{ION}(\omega_j) = 134 \cdot N_e/(\omega_j/2\pi)^2$$

: Ionospheric propagation group delay $T^P_{ION}(\omega_j) = 134 \cdot N_e/(\omega_j/2\pi)^2$: Ionospheric propagation phase delay $T_{TROP}$: Atmospheric propagation delay $N_e$: Total electron content along the signal propagation path c: Speed of light provided that j = 1, 2.

In the GPS receiver system of FIG. 2, the L1 P-code signal and the L2 P-code signal are converted by a local signal for frequency conversion that is synchronized with the reference clock so as to preserve the phases of the received signals.

Although the frequencies of the received carrier waves and code clocks are actually affected by Doppler frequency shift since the GPS satellite moves, in the interest of brevity this will not be discussed here.

When the two signals of Eqs. (3), (4) are multiplied with each other, $$\begin{aligned}O(t) &= P1_r(t) \cdot P2_r(t) \quad (5)\\&= P(t - t_p(\omega_1)) \cdot P(t - t_p(\omega_2))/2 \cdot\\&\quad [\cos\{(\omega_1 - \omega_2) \cdot t - (\omega_1 \cdot t_c(\omega_1) - \omega_2 \cdot t_c(\omega_2))\} +\\&\quad \cos\{(\omega_1 + \omega_2) \cdot t + (\omega_1 \cdot t_c(\omega_1) + \omega_2 \cdot t_c(\omega_2))\}]\end{aligned}$$

The term enclosed in brackets in Eq. 5 represents the difference and sum carrier signals of the L1 and L2 carrier waves and from the generally known fact that the ionospheric propagation group delay of L1 and L2

$$\delta T^G_{ION} = t_p(\omega_2) - t_p(\omega_1)$$
$$= T^G_{ION}(\omega_2) - T^G_{ION}(\omega_1)$$

is, within the range of the clock period $T_0$, the autocorrelation characteristic of the pseudo-random code sequence, the term $P(t-t_p(\omega_1)) \cdot P(t-t_p(\omega_2))$ can be represented as $$P(t - t_p(\omega_1)) \cdot P(t - t_p(\omega_2)) = A_p + B_p \cdot \cos(\omega_c \cdot t + \psi_p) + \quad (6)$$

[high frequency wave component of $\omega_c$] +

[non-despread random component]

provided that $$A_p = 1 - |\delta T^G_{ION}|/T_0$$
$$B_p = 2/\pi \sin(\pi \delta T^G_{ION}/T_0)$$
$$\omega_c = 2\pi/T_0$$

In other words, the first term of Eq. (6) is the direct current component, is maximum when $\delta T^G_{ION}$ is 0 within the range of $\pm T_0$, is 0 when $\delta T^G_{ION}$ is $\pm T_0$, and varies linearly in proportion to $\delta T^G_{ION}$ between these values. The second term is the basic wave component of the L1, L2 P-code signals, the third term is the high frequency wave component and the fourth term is the non-despread random component not inversely spread.

The output signals obtained when output signals $0(t)$ from the multiplier 15 are passed through the band pass filters 16, 17, whose center frequencies are respectively L1−L2 and L1+L2, can, form Eqs. (5), (6), be represented as $$0_1(t) = A_p \cdot \cos(\Omega_1 t + \psi_1) \quad (7)$$
$$0_2(t) = A_p \cdot \cos(\Omega_2 t + \psi_2) \quad (8)$$

provided that $$\Omega_1 = \omega_1 - \omega_2$$
$$\Omega_2 = \omega_1 + \omega_2$$
$$\psi_1 = \omega_1 \cdot t_c(\omega_1) - \omega_2 \cdot t_c(\omega_2)$$
$$= \rho/c \cdot (\omega_1 - \omega_2) - \omega_1 \cdot T^p_{ION}(\omega_1) +$$
$$\omega_2 \cdot T^p_{ION}(\omega_2) + (\omega_1 - \omega_2) \cdot T_{TROP}$$
$$\psi_2 = \omega_1 \cdot t_c(\omega_1) + \omega_2 \cdot t_c(\omega_2))$$
$$= \rho/c \cdot (\omega_1 + \omega_2) + \omega_1 \cdot T^p_{ION}(\omega_1) +$$
$$\omega_2 \cdot T^p_{ION}(\omega_2) + (\omega_1 + \omega_2) \cdot T_{TROP}$$

The atmospheric propagation delay $T_{TROP}$ at frequencies in the vicinity of L1, L2 is constant, not frequency dependent, and can be estimated using a radiometer or the temperature, humidity, air pressure and water vapor pressure on the ground.

The effect of the ionosphere $\delta T^G_{ION}$ and the total electron content along the propagation path can be determined from $A_p$ of Eqs. (7) and (8). Next, the phase terms in Eqs. (7), (8) are determined with reference to the clock at the reception point, whereafter the total electron content $N_e$ estimated earlier is used to correct the ionospheric phase delay to obtain information relating to the pseudo-range between the satellite and the reception point.

In the actual measurement, the A/D converters 18, 19 in FIG. 2 conduct digital sampling of output signals $0_1(t)$ and $0_2t$ at a sampling rate synchronized with the reference clock at the reception point, whereafter the amplitude of the object signal and its phase difference relative to the reference clock are calculated by the primary data processing computer 20 through analysis employing fast Fourier transformation and the like. Moreover, at this time the pseudo-range ambiguity is produced once per period of the L1 and L2 difference frequency in the case of $0_1(t)$ and once per period of the L1 and L2 sum frequency in the case of $0_2(t)$. More specifically, where $\Delta t_1$, $\Delta t_2$ are removed from the measured pseudo-ranges according to $0_1(t)$ and $0_2(t)$ and the ionospheric delay is removed from the determined value of $N_e$ $$\rho/c = \Delta t_1 + n_1 \cdot T_1 \quad (9)$$

$$\rho/c = \Delta t_2 + n_2 \cdot T_2 \quad (10)$$

provided that
$$T_1 = 2\pi/\Omega_1$$
$$T_2 = 2\pi/\Omega_2$$
$$0 \leq \Delta t_1 < T_1$$
$$0 \leq \Delta t_2 < T_2$$

$n_1$ and $n_2$ are integers and represent the ambiguities of the measurement. In the case of the GPS L1 and L2, $T_1$ is about 2.7 ns, and $T_2$ is about 0.36 ns. Solving for $n_1$ and $n_2$ has generally required a long measurement period and a long data analysis time. However, in the system according to the present invention, because of the limitation that the values of $\rho/c$ obtained in Eqs. (9), (10) must always be the same, there becomes possible an expansion up to the ambiguity of about 48.8 ns arising from the period of 20.46 MHz that is the greatest common divisor of (L1−L2) and (L1+L2). As a result, there can be realized a major reduction in measurement time and burden on the software. Furthermore, since the final measurement precision is determined by the measurement accuracy of $\Delta t_2$ in Eq. (10), the pseudo-range can easily be measured to within several millimeters.

As will be understood from the foregoing explanation, the present invention enables pseudo-range to measured, without need for code information, by multiplying together two spread modulated signals transmitted on different frequency carrier waves and received by an antenna. The equipment of the system can therefore be greatly simplified and the ambiguity arising during each period of the carrier waves during pseudo-range measurement can be dramatically reduced in comparison with the conventional carrier reconstruction method. It is, moreover, possible to realize a measurement precision of within several millimeters. Another advantage is that information on the ionospheric delay can be obtained simultaneously with the signal processing, making compensation possible. The equipment for the system can therefore be simplified and the data processing period markedly reduced.

What is claimed is:

1. A ranging system using the correlation between two spread spectrum wave signals comprising means for receiving from a single radio source two spread spectrum modulated signals simultaneously transmitted in the same code on carrier waves of different frequency, means for multiplying the received signals by each other to generate two continuous signals of frequencies respectively equal to the difference and the sum of the carrier waves of the spread spectrum signals, and means for measuring the phases of the two continuous signals with reference to a reference clock at the receiving station, whereby the ambiguity at the time of range measurement is removed.

* * * * *

UNITED STATES PATENT AND TRADEMARK OFFICE
CERTIFICATE OF CORRECTION

PATENT NO. : 5,036,330
DATED : July 30, 1991
INVENTOR(S) : Michito Imae et al.

It is certified that error appears in the above-identified patent and that said Letters Patent is hereby corrected as shown below:

On the title page, item [75], line 2, "Higashi-Murayama, both of" should be deleted.

Signed and Sealed this

Fifth Day of January, 1993

Attest:

DOUGLAS B. COMER

Attesting Officer

Acting Commissioner of Patents and Trademarks